United States Patent
Yum et al.

(10) Patent No.: US 9,627,724 B2
(45) Date of Patent: Apr. 18, 2017

(54) BATTERY PACK HAVING A COOLING PLATE ASSEMBLY

(71) Applicant: LG Chem, Ltd., Seoul (KR)

(72) Inventors: Juil Yum, Ann Arbor, MI (US); Robert Merriman, Shelby Township, MI (US); Anthony Arena, Macomb, MI (US); Todd R. Brown, Armada, MI (US)

(73) Assignee: LG Chem, Ltd., Seoul (KR)

( * ) Notice: Subject to any disclaimer, the term of this patent is extended or adjusted under 35 U.S.C. 154(b) by 251 days.

(21) Appl. No.: 14/559,975

(22) Filed: Dec. 4, 2014

(65) Prior Publication Data
US 2016/0164148 A1 Jun. 9, 2016

(51) Int. Cl.
| | | |
|---|---|---|
| *H01M 10/50* | (2006.01) | |
| *H01M 10/655* | (2014.01) | |
| *H01M 10/613* | (2014.01) | |
| *H01M 10/653* | (2014.01) | |
| *H01M 10/6551* | (2014.01) | |
| *H01M 10/6557* | (2014.01) | |

(52) U.S. Cl.
CPC ....... *H01M 10/655* (2015.04); *H01M 10/613* (2015.04); *H01M 10/653* (2015.04); *H01M 10/6551* (2015.04); *H01M 10/6557* (2015.04)

(58) Field of Classification Search
CPC . H01M 10/655; H01M 10/613; H01M 10/653
USPC ........................................................ 429/120
See application file for complete search history.

(56) References Cited

U.S. PATENT DOCUMENTS

| | | | |
|---|---|---|---|
| 1,587,425 A | 6/1926 | Schepp | |
| 2,273,244 A | 2/1942 | Cornelius | |
| 2,391,859 A | 1/1946 | Babcock | |
| 3,503,558 A | 3/1970 | Galiulo et al. | |
| (Continued) | | | |

FOREIGN PATENT DOCUMENTS

| | | | |
|---|---|---|---|
| DE | 19639115 A | 3/1998 | |
| EP | 1577966 A | 9/2005 | |
| (Continued) | | | |

OTHER PUBLICATIONS

"Gasket". Merriam-Webster. Merriam-Webster. Web. May 30, 2012. <http://www.merriam-webster.com/dictionary/gasket>.
(Continued)

*Primary Examiner* — Gary Harris
(74) *Attorney, Agent, or Firm* — Buckert Patent & Trademark Law Firm PC; John F. Buckert

(57) ABSTRACT

A battery pack having a cooling plate assembly and a battery module is provided. The cooling plate assembly has a pan member, first and second corrugated support members, a cover plate, and a thermally conductive layer. The pan member has first and second depressed plate portions. The first and second corrugated support members are disposed on the first and second depressed plate portions, respectively. The cover plate is coupled to the pan member such that the first and second corrugated support members are held between the cover plate and the pan member in first and second internal regions, respectively, defined by the cover plate and the pan member. The thermally conductive layer is disposed on the cover plate. The battery module is disposed on the thermally conductive layer.

17 Claims, 10 Drawing Sheets

(56) References Cited

U.S. PATENT DOCUMENTS

| | | |
|---|---|---|
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,620,057 A * | 4/1997 | Klemen ............ B60K 1/04 180/65.1 |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Hoerstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0086201 A1 | 7/2002 | Payen et al. |
| 2002/0182493 A1 | 12/2002 | Ovshinsky et al. |
| 2003/0080714 A1 | 5/2003 | Inoue et al. |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0090137 A1* | 4/2008 | Buck ............ H01M 2/1077 429/120 |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0293982 A1 | 12/2011 | Martz et al. |
| 2011/0293983 A1 | 12/2011 | Oury et al. |
| 2012/0082880 A1 | 4/2012 | Koetting et al. |
| 2012/0171543 A1 | 7/2012 | Hirsch et al. |
| 2013/0045410 A1 | 2/2013 | Yang et al. |
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |

(56) References Cited

U.S. PATENT DOCUMENTS

2014/0227575 A1 8/2014 Ketkar
2014/0308558 A1 10/2014 Merriman et al.

FOREIGN PATENT DOCUMENTS

| | | | |
|---|---|---|---|
| EP | 1852925 | A | 11/2007 |
| EP | 2262048 | A | 12/2010 |
| GB | 481891 | A | 3/1938 |
| JP | 08111244 | A | 4/1996 |
| JP | H09129213 | A | 5/1997 |
| JP | H09219213 | A | 8/1997 |
| JP | 2001105843 | A | 4/2001 |
| JP | 2002038033 | A | 2/2002 |
| JP | 2002319383 | A | 10/2002 |
| JP | 2002333255 | A | 11/2002 |
| JP | 2003188323 | A | 7/2003 |
| JP | 2003282112 | A | 10/2003 |
| JP | 2004333115 | A | 11/2004 |
| JP | 2005126315 | A | 5/2005 |
| JP | 2005147443 | A | 6/2005 |
| JP | 2005349955 | A | 12/2005 |
| JP | 2006139928 | A | 6/2006 |
| JP | 2007305425 | A | 11/2007 |
| JP | 2008054379 | A | 3/2008 |
| JP | 2008062875 | A | 3/2008 |
| JP | 2008080995 | A | 4/2008 |
| JP | 2008159440 | A | 7/2008 |
| JP | 2009009889 | A | 1/2009 |
| JP | 2009054297 | A | 3/2009 |
| KR | 20050092605 | A | 9/2005 |
| KR | 100637472 | B1 | 10/2006 |
| KR | 100765659 | B1 | 10/2007 |
| KR | 20080047641 | A | 5/2008 |
| KR | 20090082212 | A | 7/2009 |
| KR | 100921346 | B1 | 10/2009 |
| KR | 20090107443 | A | 10/2009 |
| KR | 1020100119497 | A | 11/2010 |
| KR | 1020100119498 | A | 11/2010 |
| KR | 1020110013269 | A | 2/2011 |
| KR | 1020110013270 | A | 2/2011 |
| KR | 20110126764 | A | 11/2011 |
| WO | 2006101343 | A | 9/2006 |
| WO | 2007007503 | A | 1/2007 |
| WO | 2007115743 | A2 | 10/2007 |
| WO | 2008111162 | A | 9/2008 |
| WO | 2009073225 | A | 6/2009 |
| WO | 2011145830 | A2 | 11/2011 |

OTHER PUBLICATIONS

International Search Report for International application No. PCT/KR2013/004015 dated Sep. 26, 2013.
International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.

* cited by examiner

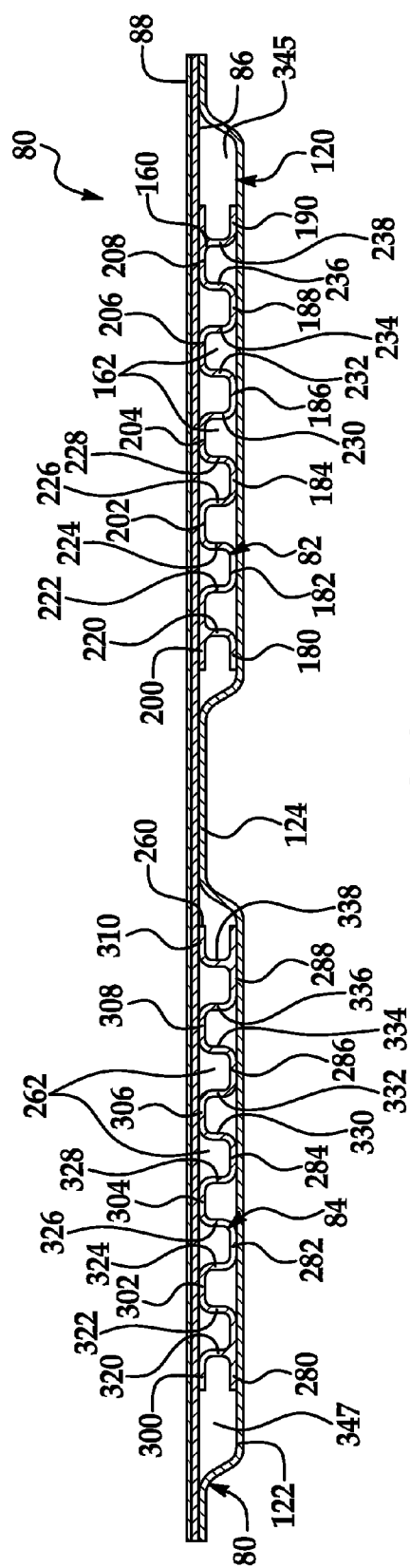
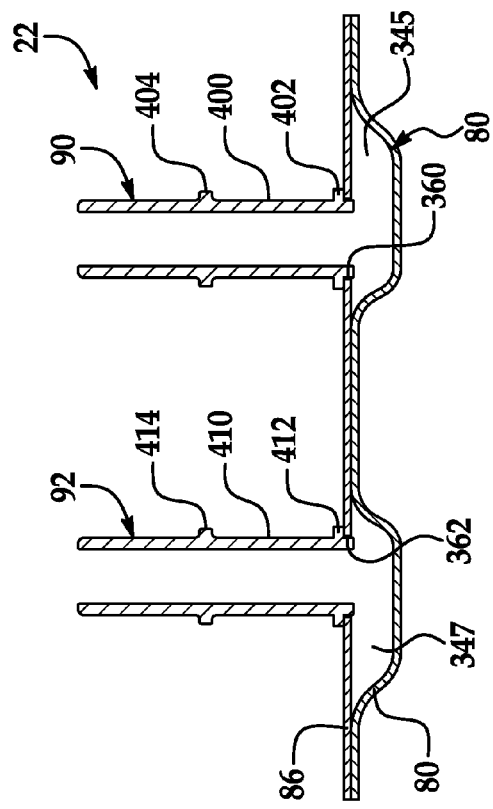
FIG. 8
FIG. 9

BATTERY PACK HAVING A COOLING PLATE ASSEMBLY

BACKGROUND

The inventors herein have recognized a need for a battery pack having a cooling plate assembly with improved internal support components.

SUMMARY

A battery pack in accordance with an exemplary embodiment is provided. The battery pack includes a cooling plate assembly having a pan member, first and second corrugated support members, a cover plate, and a thermally conductive layer. The pan member has first and second depressed plate portions, a central rib portion, and a peripheral rim portion. The central rib portion is coupled to and disposed between at least a portion of the first and second depressed plate portions. The peripheral rim portion extends around at least a portion of the first and second depressed plate portions. The central rib portion and the peripheral rim portion are substantially co-planar with one another. The first and second corrugated support members are disposed on the first and second depressed plate portions, respectively, of the pan member. The cover plate is disposed on and coupled to the pan member such that the first and second corrugated support members are held between the cover plate and the pan member in first and second internal regions, respectively, defined by the cover plate and the pan member. The thermally conductive layer is disposed on and contacts the cover plate. The battery pack further includes a battery module that is disposed on and contacts the thermally conductive layer.

BRIEF DESCRIPTION OF THE DRAWINGS

FIG. 8 is a cross-sectional schematic of the cooling plate assembly of FIG. 3 taken along lines 8-8 in FIG. 3;

FIG. 9 is another cross-sectional schematic of the cooling plate assembly of FIG. 3 taken along lines 9-9 in FIG. 3;

DETAILED DESCRIPTION

Figure 1:
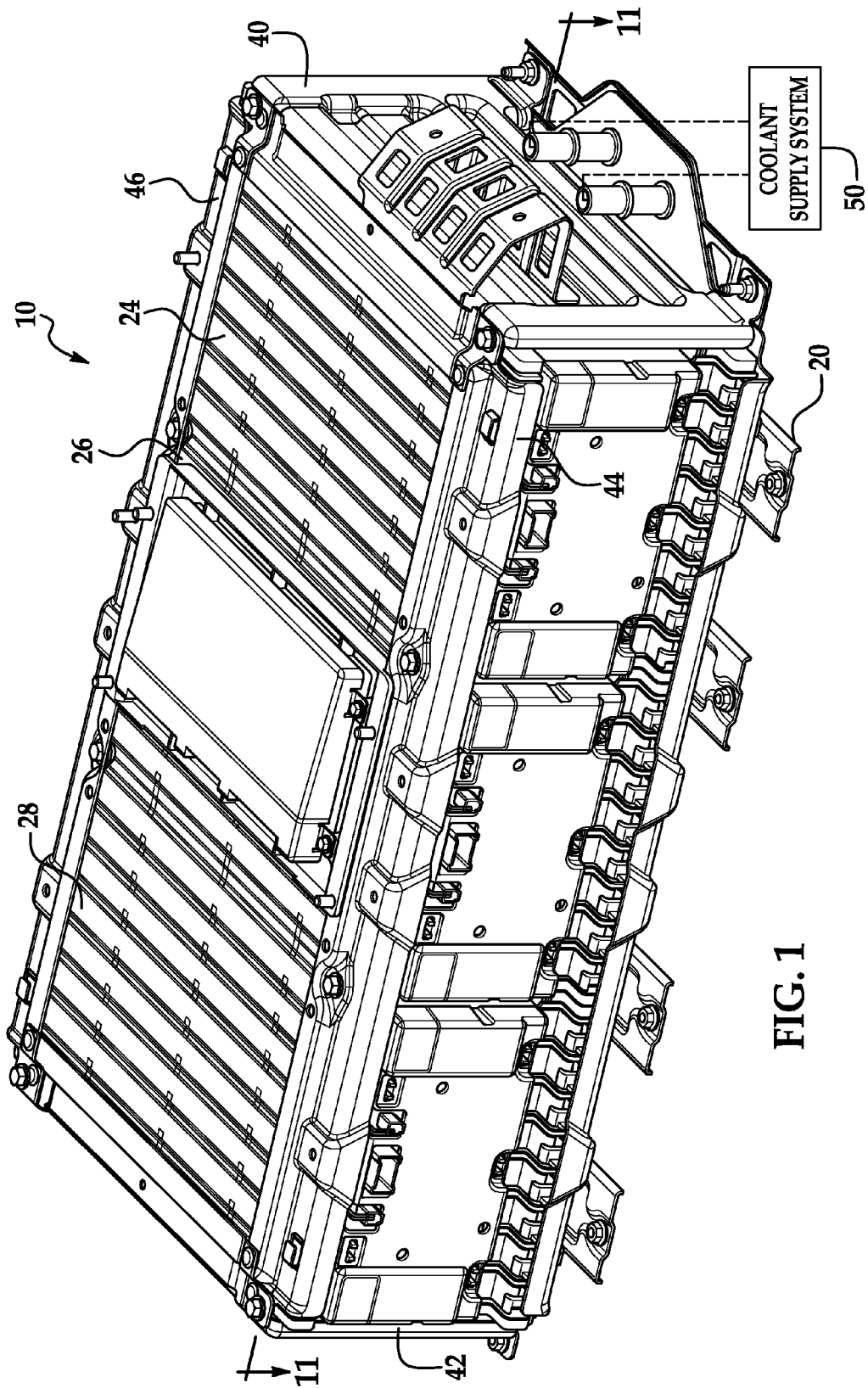
FIG. 1 is a schematic of a battery pack in accordance with an exemplary embodiment.
Figure 2:
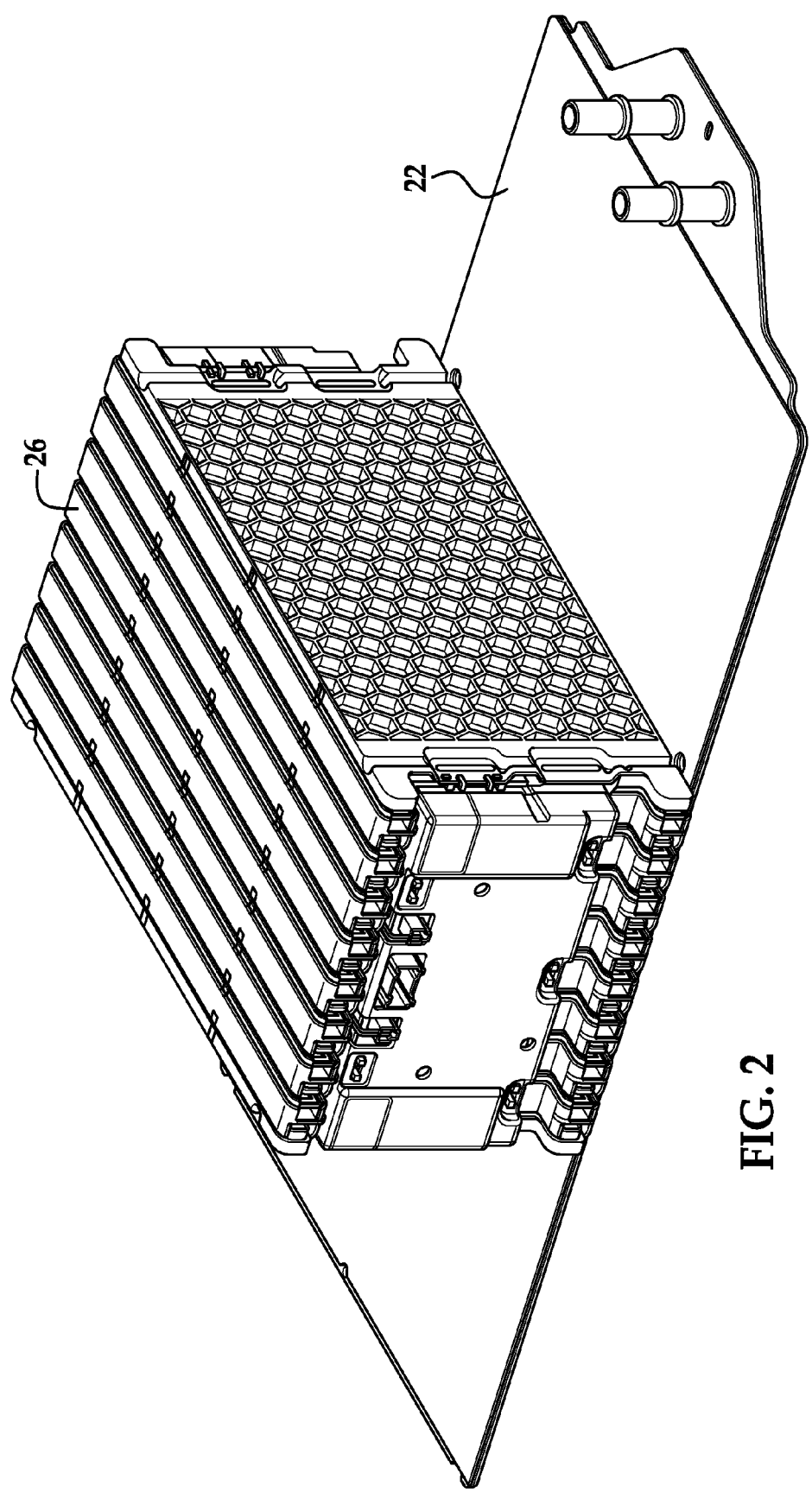
FIG. 2 is a schematic of a portion of the battery pack of FIG. 1.

Referring to FIGS. 1-4, a battery pack 10 in accordance with an exemplary embodiment is illustrated. The battery pack 10 includes a supporting frame 20, a cooling plate assembly 22, battery modules 24, 26, 28, end support plates 40, 42, top support plates 44, 46, and a coolant supply system 50. An advantage of the battery pack 10 is that the cooling plate assembly 22 has first and second corrugated support members 82, 84 (shown in FIG. 5) which prevents the cooling plate assembly 22 from collapsing when a vacuum is applied to the assembly 22.

The supporting frame 20 is adapted to hold the cooling plate assembly 22 therein. In an exemplary embodiment, the supporting frame 20 is constructed of steel.

Referring to FIGS. 3-10, the cooling plate assembly 22 is adapted to cool the battery modules 24, 26, 28. The cooling plate assembly 22 includes a pan member 80, first and second corrugated support members 82, 84, a cover plate 86, a thermally conductive layer 88, and first and second tubular ports 90, 92.

Referring to FIGS. 6-9, the pan member 80 includes first and second depressed plate portions 120, 122, a central rib portion 124, and a peripheral rim portion 126. The central rib portion 124 is coupled to and disposed between at least a portion of the first and second depressed plate portions 120, 122. The peripheral rim portion 126 is coupled to and extends around at least a portion of the first and second depressed plate portions 120, 122 and extend completely around an outer periphery of the pan member 80. The central rib portion 124 and the peripheral rim portion 126 are substantially co-planar with one another. The pan member 80 includes a first end 128 and a second end 130. Further, the central rib portion 124 includes a first end 140 and a second end 142. The first end 140 of the central rib portion 124 extends from the first end 128 of the pan member 80, and the second end 142 of the central rib portion 124 is disposed a predetermined distance from the second end 130 of the pan member 80 such that a first internal region 345 (shown in FIG. 8) of the cooling plate assembly 22 fluidly communicates with a second internal region 347 of the cooling plate assembly 22. In an exemplary embodiment, the pan member 80 is constructed of aluminum. In an alternative embodiment, the pan member 80 could be constructed of other materials such as steel for example.

Figure 5:
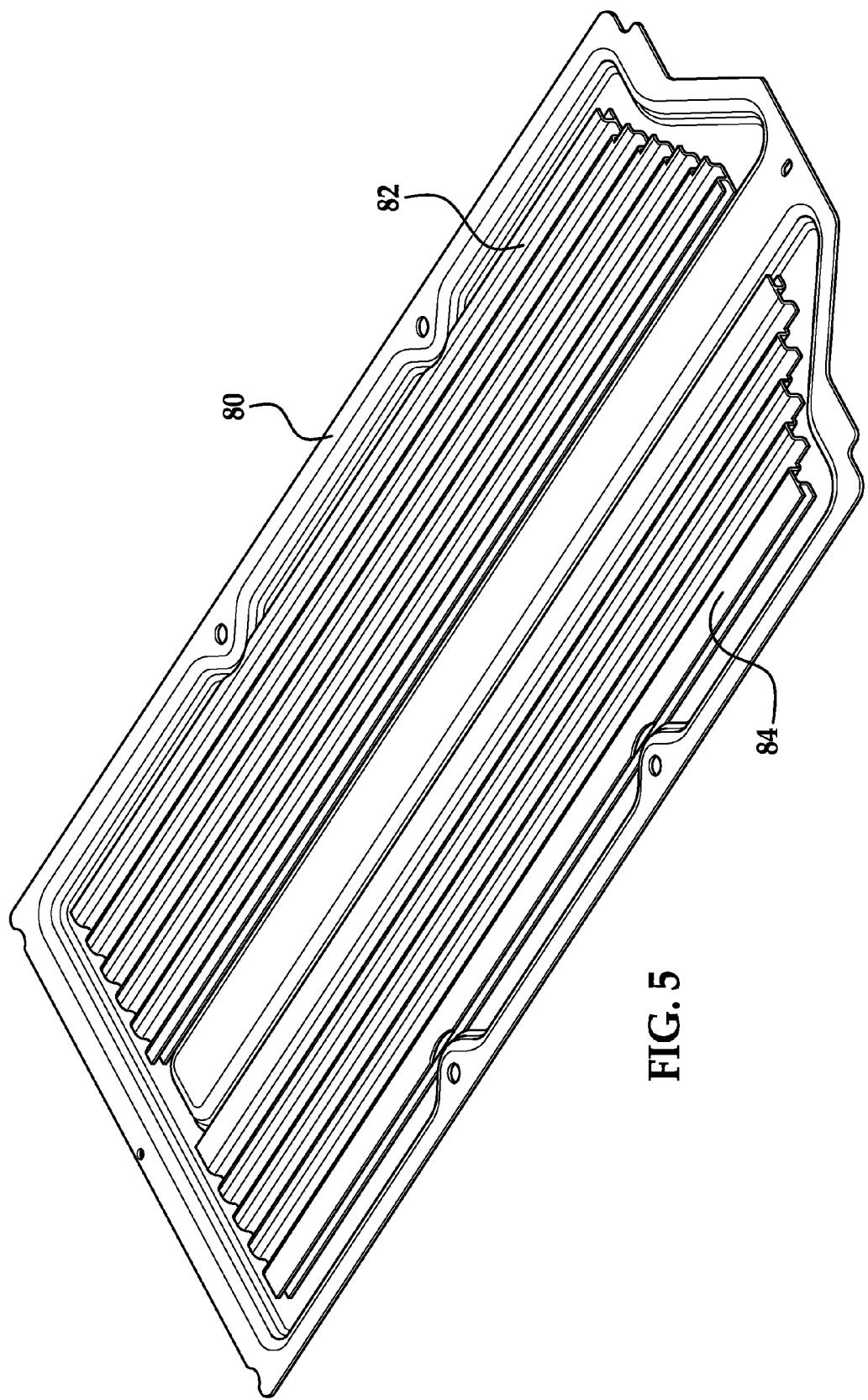
FIG. 5 is a schematic of a pan member and first and second corrugated support members utilized in the cooling plate assembly of FIG. 3.
Figure 6:
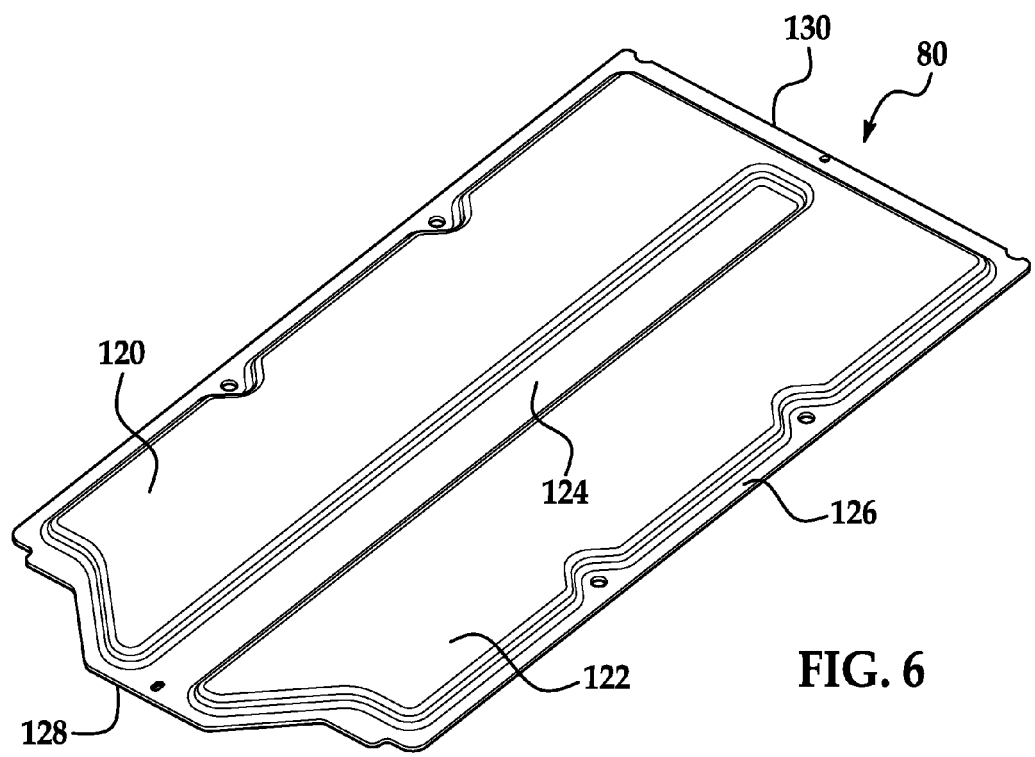
FIG. 6 is another schematic of the pan member of FIG. 5.
Figure 7:
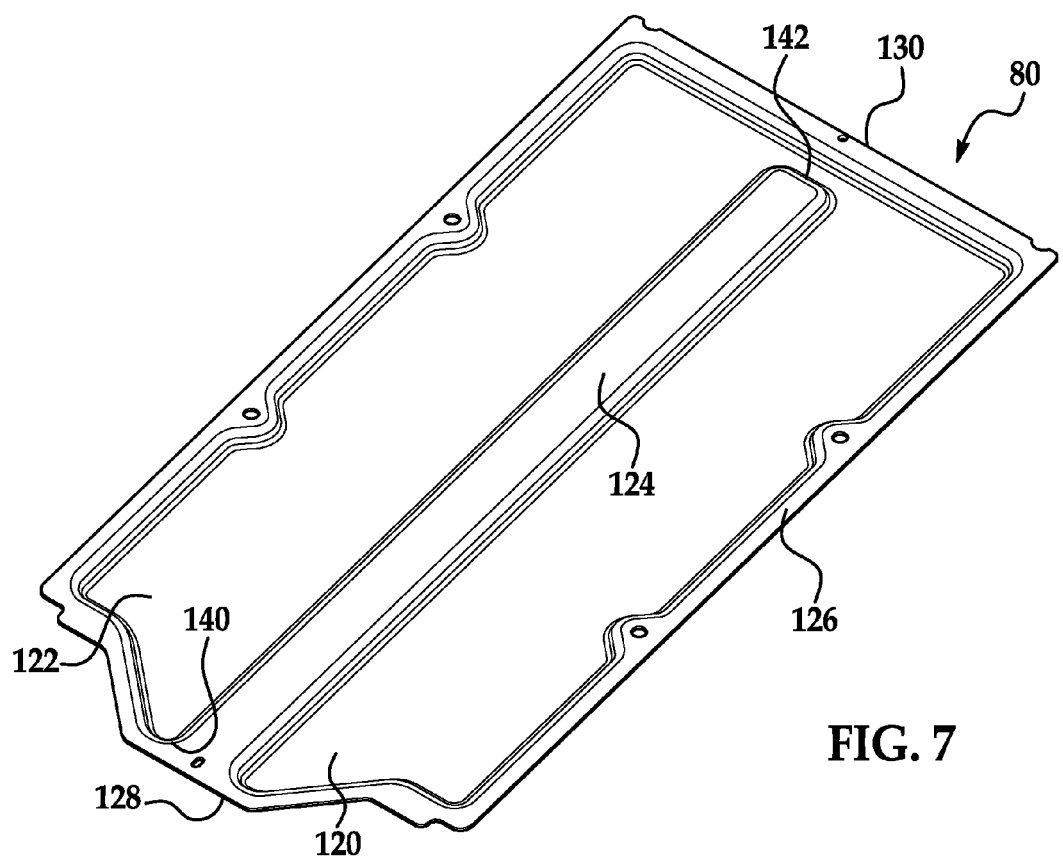
FIG. 7 is another schematic of the pan member of FIG. 5.
Figure 10:
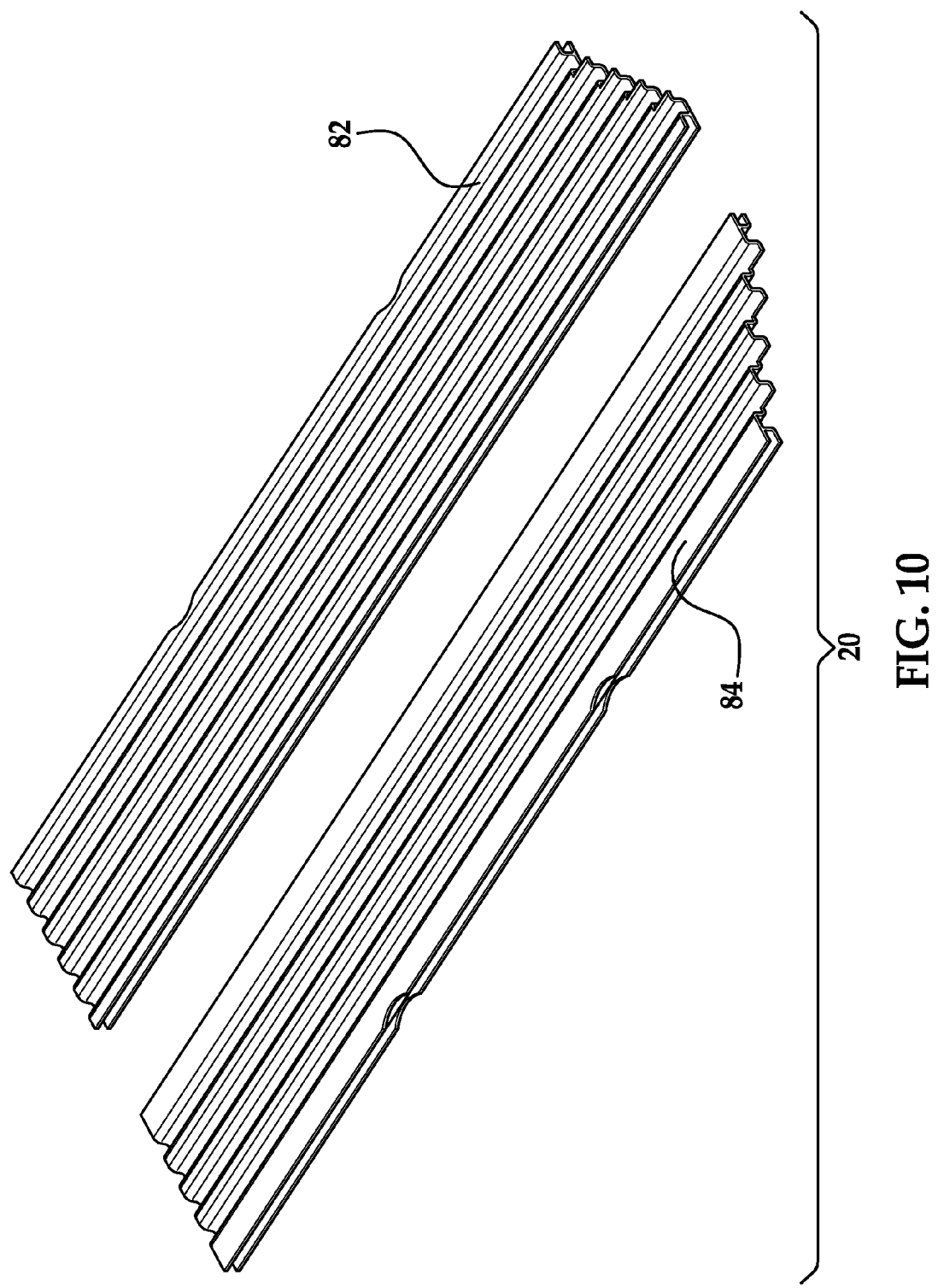
FIG. 10 is a schematic of the first and second corrugated support members of FIG. 5.

Referring to FIGS. 5 and 8, the first and second corrugated support members 82, 84 are disposed on the first and second depressed plate portions 120, 122, respectively, of the pan member 80. The first and second corrugated support members 82, 84 provide additional internal support to the cooling plate assembly 22 which prevents the assembly 22 from collapsing when a vacuum is applied to the first and second tubular ports 90, 92 of the assembly 22. In an exemplary embodiment, each of the first and second corrugated support members 82, 84 are constructed of aluminum. However, in an alternative embodiment, each of the first and second corrugated support members 82, 84 could be constructed of other materials such as steel, stainless steel, or plastic for example. Further, in an exemplary embodiment, the first and second corrugated support members 82, 84 each have a longitudinal length that is at least 90 percent of a longitudinal length of the pan member 80.

The first corrugated support member 82 includes a serpentine shaped body 160 defining a plurality of flow channels 162 therethrough. The serpentine shaped body 160 includes bottom wall portions 180, 182, 184, 186, 188, 190, top wall portions 200, 202, 204, 206, 208, and vertical wall portions 220, 222, 224, 226, 228, 230, 232, 234, 236, 238.

The bottom wall portion 180 and the top wall portion 200 are coupled to and extend from first and second ends, respectively, of the vertical wall portion 220, and extend in a first direction (e.g., leftwardly in FIG. 8) substantially parallel one another.

The bottom wall portion 182 and the top wall portion 200 are coupled to and extend from first and second ends, respectively, of the vertical wall portion 222, and extend in the first direction and a second direction (e.g., rightwardly in FIG. 8), respectively, from the wall portion 222 substantially parallel one another.

The bottom wall portion 182 and the top wall portion 202 are coupled to and extend from first and second ends, respectively, of the vertical wall portion 224, and extend in the first and second directions, respectively, from the wall portion 224 substantially parallel one another.

The bottom wall portion 184 and the top wall portion 202 are coupled to and extend from first and second ends, respectively, of the vertical wall portion 226, and extend in second and first directions, respectively, from the wall portion 226 substantially parallel one another.

The bottom wall portion 184 and the top wall portion 204 are coupled to and extend from first and second ends, respectively, of the vertical wall portion 228, and extend in first and second directions, respectively, from the wall portion 228 substantially parallel one another.

The bottom wall portion 186 and the top wall portion 204 are coupled to and extend from first and second ends, respectively, of the vertical wall portion 230, and extend in the second and first directions, respectively, from the wall portion 230 substantially parallel one another.

The bottom wall portion 186 and the top wall portion 206 are coupled to and extend from first and second ends, respectively, of the vertical wall portion 232, and extend in first and second directions, respectively, from the wall portion 232 substantially parallel one another.

The bottom wall portion 188 and the top wall portion 206 are coupled to and extend from first and second ends, respectively, of the vertical wall portion 234, and extend in the second and first directions, respectively, from the wall portion 234 substantially parallel one another.

The bottom wall portion 188 and the top wall portion 208 are coupled to and extend from first and second ends, respectively, of the vertical wall portion 236, and extend in first and second directions, respectively, from the wall portion 236 substantially parallel one another.

The bottom wall portion 190 and the top wall portion 208 are coupled to and extend from first and second ends, respectively, of the vertical wall portion 238, and extend in the second and first directions, respectively, from the wall portion 238 substantially parallel one another. The top wall portion 208 further extends in the second direction substantially parallel to the bottom wall portion 190.

The second corrugated support member 84 includes a serpentine shaped body 260 defining a plurality of flow channels 262 therethrough. The serpentine shaped body 260 includes a bottom wall portions 280, 282, 284, 286, 288, top wall portions 300, 302, 304, 306, 308, 310, and vertical wall portions 320, 322, 324, 326, 328, 330, 332, 334, 336, 338.

The bottom wall portion 280 and the top wall portion 300 are coupled to and extend from first and second ends, respectively, of the vertical wall portion 320, and extend in a first direction (e.g., leftwardly in FIG. 8) from the wall portion 320 substantially parallel one another. The bottom wall portion 280 further extends in the second direction (rightwardly in FIG. 8) from the vertical wall portion 320.

The bottom wall portion 280 and the top wall portion 302 are coupled to and extend from first and second ends, respectively, of the vertical wall portion 322, and extend in first and second directions, respectively, from the wall portion 322 substantially parallel one another.

The bottom wall portion 282 and the top wall portion 302 are coupled to and extend from first and second ends, respectively, of the vertical wall portion 324, and extend in second and first directions, respectively, from the wall portion 324 substantially parallel one another.

The bottom wall portion 282 and the top wall portion 304 are coupled to and extend from first and second ends, respectively, of the vertical wall portion 326, and extend in first and second directions, respectively, from the wall portion 326 substantially parallel one another.

The bottom wall portion 284 and the top wall portion 304 are coupled to and extend from first and second ends, respectively, of the vertical wall portion 328, and extend in second and first directions, respectively, from the wall portion 328 substantially parallel one another.

The bottom wall portion 284 and the top wall portion 306 are coupled to and extend from first and second ends, respectively, of the vertical wall portion 330, and extend in first and second directions, respectively, from the wall portion 330 substantially parallel one another.

The bottom wall portion 286 and the top wall portion 306 are coupled to and extend from first and second ends, respectively, of the vertical wall portion 332, and extend in the second and first directions, respectively, from the wall portion 332 substantially parallel one another.

The bottom wall portion 286 and the top wall portion 308 are coupled to and extend from first and second ends, respectively, of the vertical wall portion 334, and extend in first and second directions, respectively, from the wall portion 324 substantially parallel one another.

The bottom wall portion 288 and the top wall portion 308 are coupled to and extend from first and second ends, respectively, of the vertical wall portion 336, and extend in the second and first directions, respectively, from the wall portion 336 substantially parallel one another.

The bottom wall portion 288 and the top wall portion 310 are coupled to and extend from first and second ends, respectively, of the vertical wall portion 338, and extend in the first and second directions, respectively, from the wall portion 338 substantially parallel one another. The bottom wall portion 288 further extends in the second direction from the vertical wall portion 338.

Figure 4:
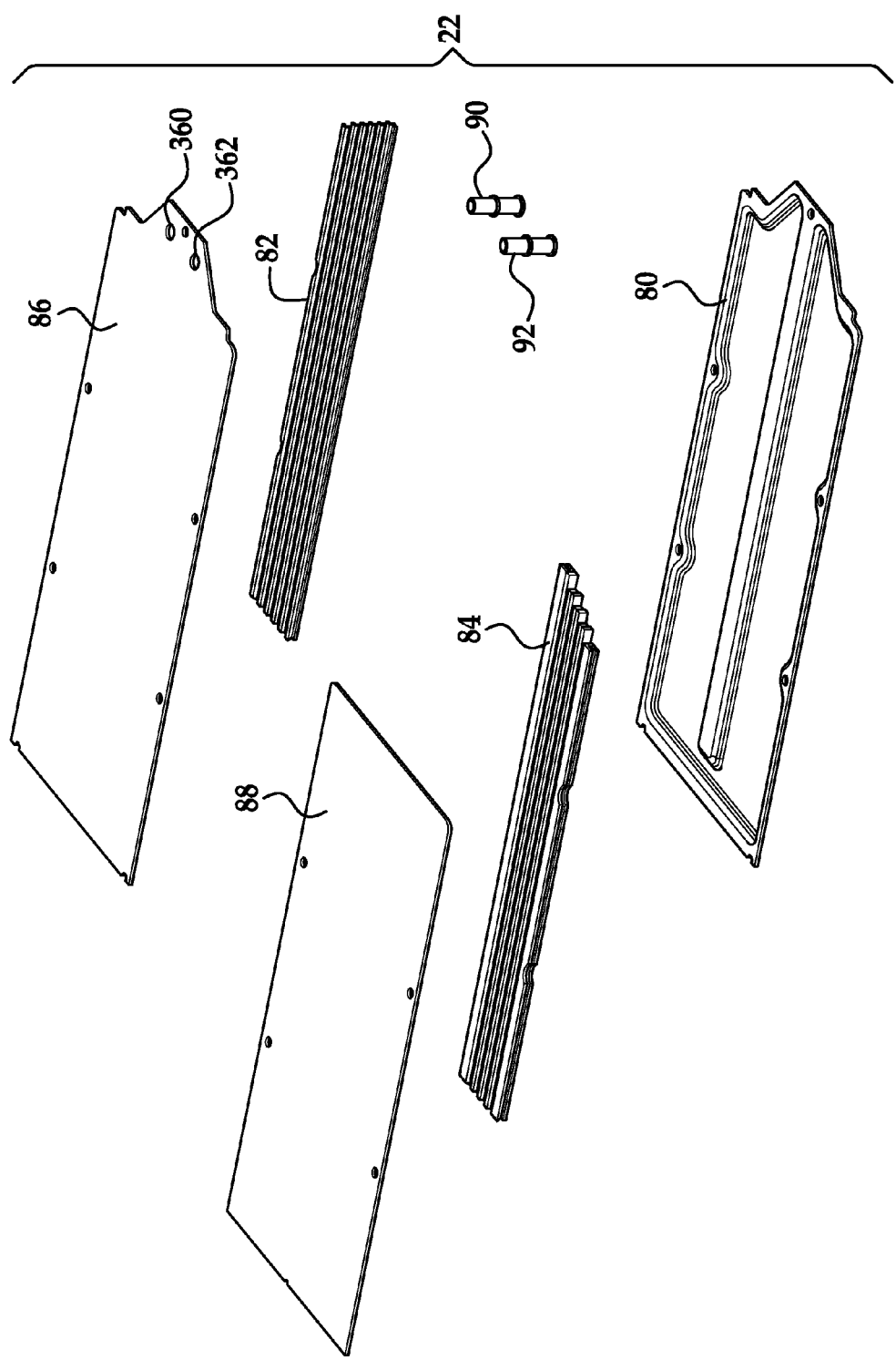
FIG. 4 is an exploded schematic of the cooling plate assembly of FIG. 3.

Referring to FIGS. 4 and 8, the cover plate 86 is disposed on and coupled to the pan member 80 such that the first and second corrugated support members 82, 84 are held between the cover plate 86 and the pan member 80 in first and second internal regions 345, 347, respectively, defined by the cover plate 86 and the pan member 80. Further, the cover plate 86 directly contacts and is supported by the peripheral rim portion 126, the central rib portion 124, and the first and second corrugated support members 82, 84. It is noted that the peripheral rim portion 126, the central rib portion 124, and the first and second corrugated support members 82, 84 provide improved support of the cover plate 86 in a direction substantially perpendicular to a top surface of the cover plate 86 and prevents the cooling plate assembly 22 from collapsing if a vacuum is applied to the interior of the assembly 22. The cover plate 86 includes apertures 360, 362 extending therethrough for receiving portions of the first and second tubular ports 90, 92, respectively, therethrough. In an exemplary embodiment, the cover plate 86 is constructed of aluminum. Further, the cover plate 86 is brazed to the pan member 80. In an alternative embodiment, the cover plate 86 could be constructed of other materials such as steel, stainless steel, or plastic for example.

Figure 3:
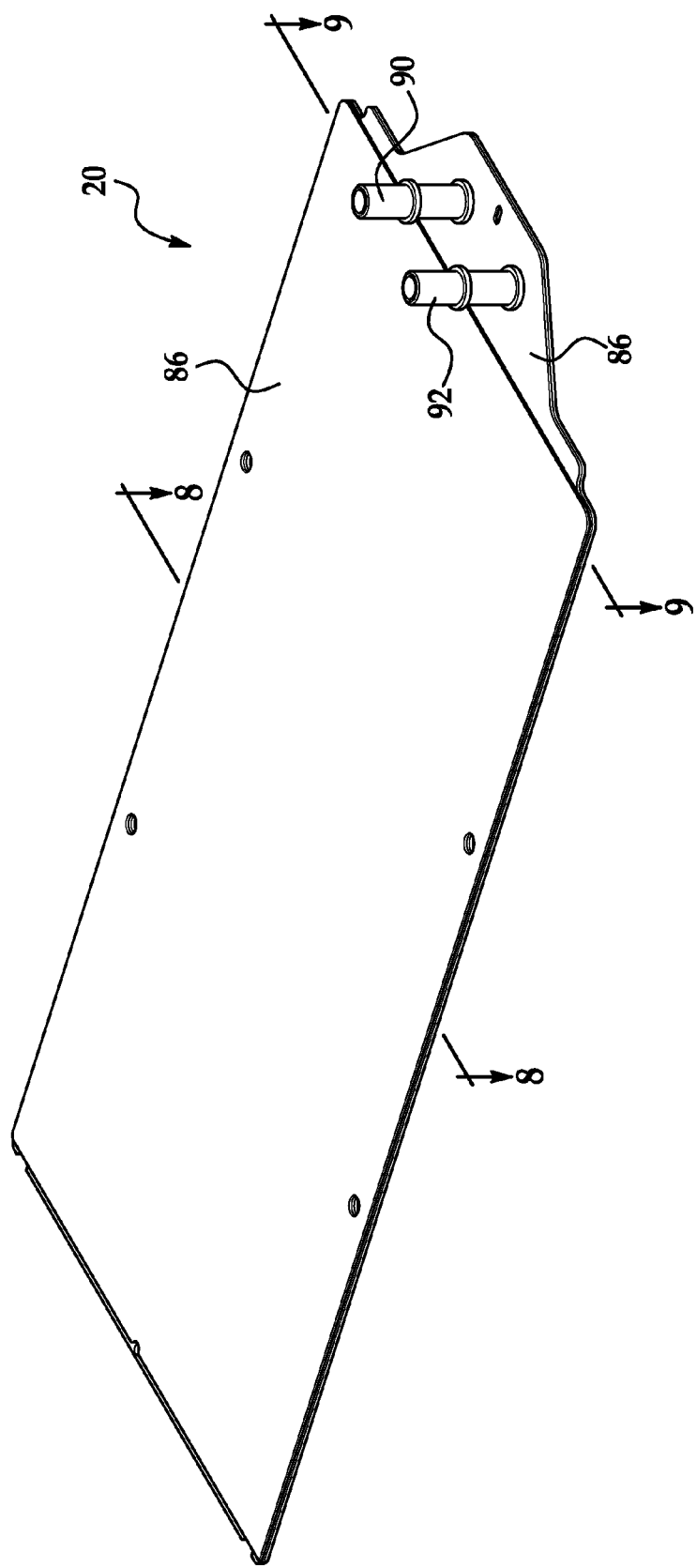
FIG. 3 is a schematic of a cooling plate assembly utilized in the battery pack of FIG. 1.

Referring to FIGS. 3 and 4, the thermally conductive layer 88 is disposed on and contacts the cover plate 86. In an exemplary embodiment, the thermally conductive layer 88 is a thermoplastic foam layer.

Referring to FIGS. 3, 4 and 9, the first and second tubular ports 90, 92 extend at least partially through the apertures 360, 362, respectively, of the cover plate 86 and are coupled to the cover plate 86. The first and second tubular ports 90, 92 fluidly communicate with the first and second internal regions 345, 347, respectively. The first tubular port 90 includes a tubular body 400 and peripheral flanges 402, 404 extending around the tubular body 400. The peripheral flange 402 abuts against a top surface of the cover plate 86. The second tubular port 92 includes a tubular body 410 and peripheral flanges 412, 414 extending around the tubular body 410. The peripheral flange 412 abuts against a top surface of the cover plate 86. In an exemplary embodiment, the first and second tubular ports 90, 92 are each constructed of aluminum. Further, the first and second tubular ports 90, 92 are brazed to the cover member 86. In an alternative embodiment, first and second tubular ports 90, 92 could be constructed of other materials such as steel, stainless steel, or plastic for example.

Referring to FIGS. 1, 8 and 9, the first tubular port 90 is adapted to receive a coolant therethrough from the coolant supply system 50 that flows through the first internal region 345 and flow channels 162 in the first corrugated support member 82 to the second internal region 347 and flow channels 262 in the second corrugated support member 84. The coolant further flows from the second internal region 347 to the second tubular port 92 and then exits the second tubular port 92 and returns to the coolant supply system 50.

Figure 11:
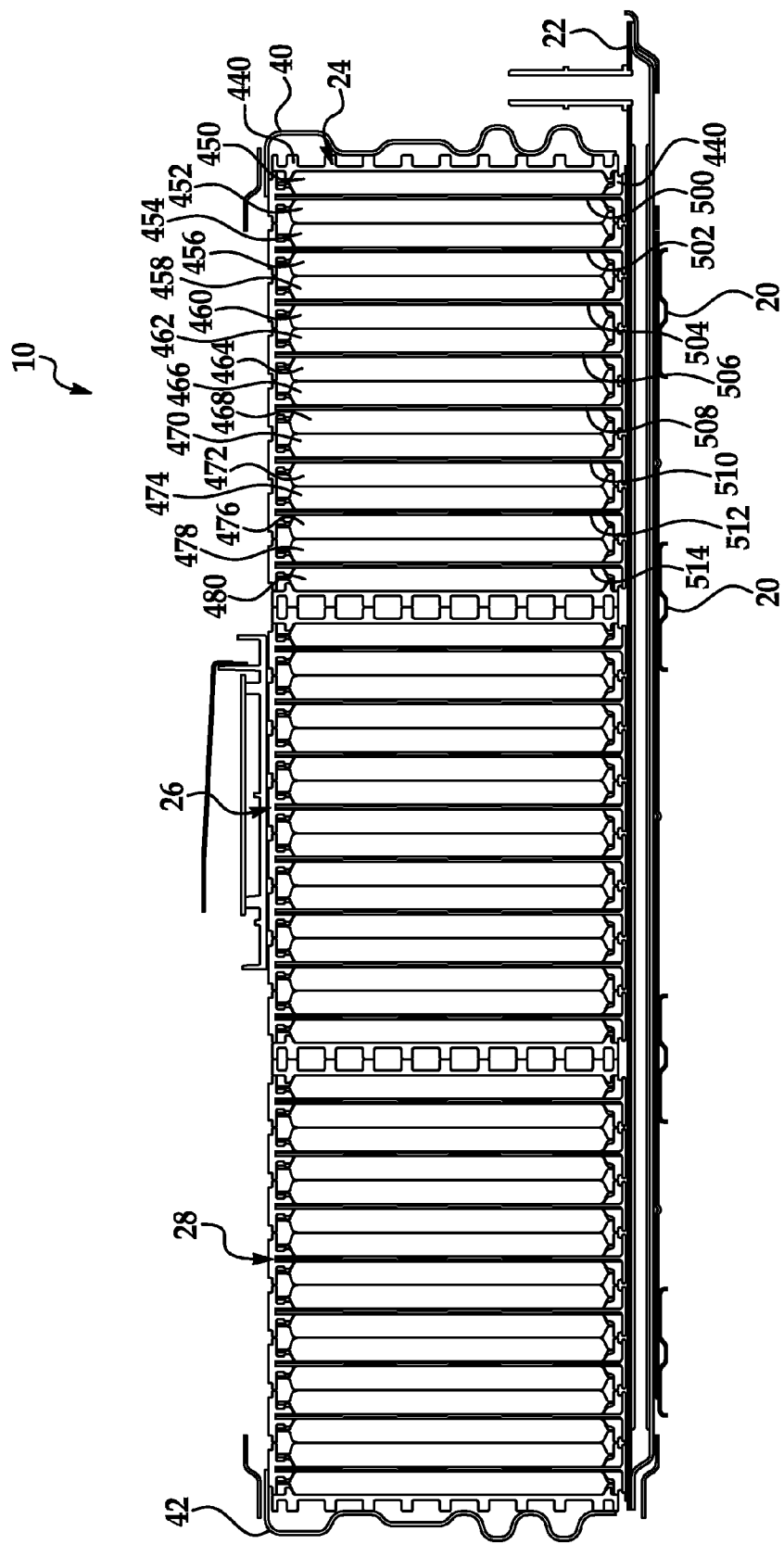
FIG. 11 is a cross-sectional schematic of the battery pack of FIG. 1 taken along lines 11-11 in FIG. 1.
Figure 12:
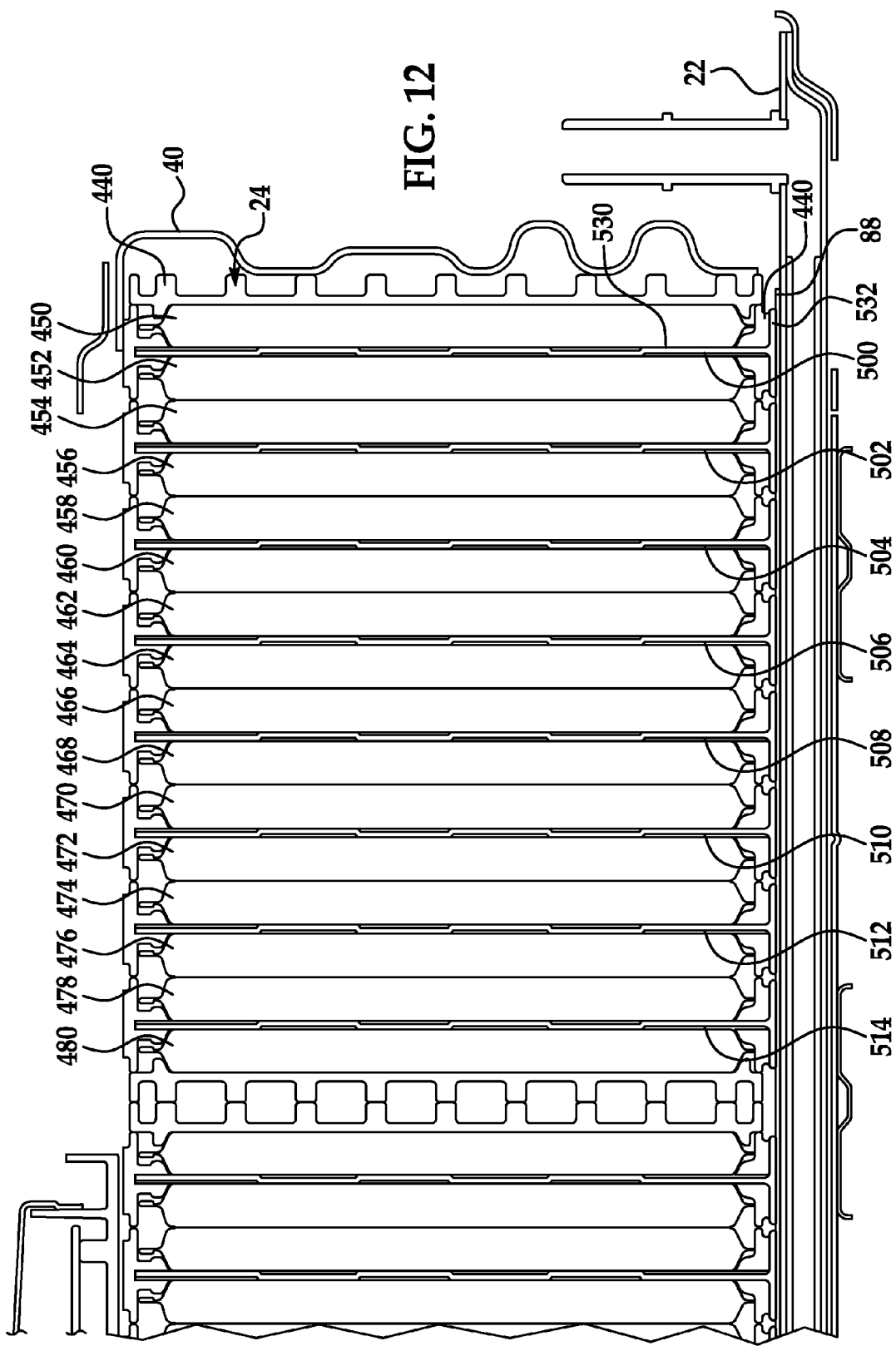
FIG. 12 is an enlarged cross-sectional schematic of a portion of the battery pack of FIG. 11.

Referring to FIGS. 1, 11 and 12, the battery modules 24, 26, 28 are disposed on and contact the thermally conductive layer 88. The structure of the battery modules 24, 26, 28 identical to one another so only the battery module 24 will be discussed in greater detail below.

The battery module 24 includes a housing 440, battery cells 450, 452, 454, 456, 458, 460, 462, 464, 466, 468, 470, 472, 474, 476, 478, 480 and cooling fins 500, 502, 504, 506, 508, 510, 512, 514. Each of the battery cells 450-480 have a rectangular-shaped housing and first and second electrical terminals extending from an upper side of the housing.

The battery cells 450-480 are disposed within the housing 440. The battery cells 450, 452 are disposed on opposite sides of the cooling fin 500, and the battery cells 454, 456 are disposed on opposite sides of the cooling fin 502. Further, the battery cells 458, 460 are disposed on opposite sides of the cooling fin 504, and the battery cells 462, 464 are disposed on opposite sides of the cooling fin 506. Also, the battery cells 466, 468 are disposed on opposite sides of the cooling fin 508, and the battery cells 470, 472 are disposed on opposite sides of the cooling fin 510. Still further, the battery cells 474, 476 are disposed on opposite sides of the cooling fin 512, and the battery cells 478, 480 are disposed on opposite sides of the cooling fin 514.

Referring to FIG. 12, the cooling fins 500-514 are disposed within the housing 440. Since each of the cooling fins 500-514 have an identical structure, only the structure of the cooling fin 500 will be explained in greater detail below. In an exemplary embodiment, the cooling fin 500 is constructed of aluminum. Of course, in an alternative embodiment, the cooling fin 500 could be constructed of other materials such as steel or a thermally conductive plastic for example.

The cooling fin 500 includes first and second sheet portions 530, 532. The second sheet portion 532 is coupled to a first end of the first sheet portion 530 and extends substantially perpendicular to the first sheet portion 530. The first end of the first sheet portion 530 extends through an aperture in a bottom wall of the housing 440 such that the second sheet portion 532 is disposed on an outer surface of the bottom wall of the housing 440. The second sheet portion 532 is disposed directly on and contacts the thermally conductive layer 88. The first sheet portion 530 is disposed between and against battery cells 450, 452.

During operation, heat energy from the battery cells 450, 452 is conducted through the first sheet portion 530 to the second sheet portion 532, and is further conducted to the cooling plate assembly 22 such that the coolant flowing through the cooling plate assembly 22 absorbs the heat energy. As a result, the cooling plate assembly 22 maintains the battery module 24 within a desired temperature range.

Referring to FIG. 1, the end support plates 40, 42 are coupled to first and second ends, respectively, of the supporting frame 20 and extend substantially perpendicular to the supporting frame 20. The battery modules 24, 26, 28 are disposed and sandwiched between the end support plates 40, 42.

The top support plates 44, 46 are coupled to and between upper ends of the end support plates 40, 42, such that the battery modules 24, 26, 28 are fixedly held between the top support plates 44, 46, the end support plates 40, 42, and the cooling plate assembly 22.

The battery pack described herein provides a substantial advantage over other battery packs. In particular, the battery pack utilizes a cooling plate assembly having first and second corrugated support members which prevents the cooling plate assembly from collapsing when a vacuum is applied to the cooling plate assembly.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
    a cooling plate assembly having a pan member, first and second corrugated support members, a cover plate, and a thermally conductive layer;
    the pan member having first and second depressed plate portions, a central rib portion, and a peripheral rim portion; the central rib portion being coupled to and disposed between at least a portion of the first and second depressed plate portions; the peripheral rim portion extending around at least a portion of the first and second depressed plate portions; the central rib portion and the peripheral rim portion being substantially co-planar with one another;
    the first corrugated support member being entirely disposed in a first internal region defined by the first depressed plate portion of the pan member and the cover plate, the first corrugated support member being further disposed between and directly contacting both the first depressed plate portion and the cover plate; the first corrugated support member having a first plurality of flow channels extending longitudinally therethrough from a first end of the first corrugated support member to a second end of the first corrugate support member;

the second corrugated support member being entirely disposed in a second internal region defined by the second depressed plate portion of the pan member and the cover plate, the second corrugated support member being further disposed a predetermined distance away from the first corrugated support member, the second corrugated support member being further disposed between and directly contacting both the second depressed plate portion and the cover plate; the second corrugated support member having a second plurality of flow channels extending longitudinally therethrough from a first end of the second corrugated support member to a second end of the second corrugate support member;

the cover plate being disposed on and coupled to the pan member, the cover plate having first and second surfaces being disposed opposite to one another, the first surface directly contacting the first and second corrugated support members and the peripheral rim portion of the pan member, the second surface being disposed on and directly contacting the thermally conductive layer, first and second corrugated support members being held between the cover plate and the pan member in the first and second internal regions, respectively; and a battery module being disposed on and contacting the thermally conductive layer.

2. The battery pack of claim 1, wherein the first and second corrugated support members each have a longitudinal length that is at least 90 percent of a longitudinal length of the pan member.

3. The battery pack of claim 1, wherein the first and second corrugated support members are each constructed of extruded aluminum.

4. The battery pack of claim 1, wherein the central rib portion has a longitudinal length that is at least 90 percent of a longitudinal length of the pan member.

5. The battery pack of claim 4, wherein the central rib portion includes first and second ends; the first end of the central rib portion extending from a first end of the peripheral rim portion, and the second end of the central rib portion being disposed a first distance from a second end of the peripheral rim portion such that the first internal region fluidly communicates with the second internal region.

6. The battery pack of claim 1, wherein the thermally conductive layer is a thermoplastic foam layer.

7. The battery pack of claim 1, further comprising first and second tubular ports, the cover plate having first and second apertures extending therethrough, the first and second tubular ports extending at least partially through the first and second apertures, respectively, and being coupled to the cover plate.

8. The battery pack of claim 7, wherein the first and second tubular ports fluidly communicate with the first and second internal regions, respectively.

9. The battery pack of claim 8, wherein the first tubular port is adapted to receive a coolant therethrough that flows through the first internal region and the first plurality of flow channels in the first corrugated support member to the second internal region and the second plurality of flow channels in the second corrugated support member; the coolant further flowing from the second internal region to the second tubular port and then exiting the second tubular port.

10. The battery pack of claim 1, wherein the battery module includes a housing, first and second battery cells, and a cooling fin; the first and second battery cells being disposed in the housing; the cooling fin being disposed between and contacting the first and second battery cells within the housing, the cooling fin further extending through the housing and contacting the thermally conductive layer.

11. The battery pack of claim 10, wherein the cooling fin includes first and second sheet portions, the second sheet portion being coupled to an end of the first sheet portion and extending substantially perpendicular to the first sheet portion.

12. The battery pack of claim 11, wherein the first sheet portion is disposed between and against the first and second battery cells and further extends through the housing, and the second sheet portion being disposed on and against the thermally conductive layer of the cooling plate assembly.

13. The battery pack of claim 1, wherein the pan member is integrally formed with the first and second depressed plate portions, the central rib portion, and the peripheral rim portion therein.

14. The battery pack of claim 1, wherein the first corrugated support member has at least first, second, and third wall top wall portions disposed apart from one another and first, second, and third bottom wall portions disposed apart from one another, the first, second, and third wall top wall portions directly contacting the cover plate, the first, second, and third wall bottom wall portions directly contacting the first depressed plate portion of the pan member.

15. A battery pack, comprising:
a cooling plate assembly having a pan member, first and second corrugated support members, a cover plate, and a thermally conductive layer;

the pan member having first and second depressed plate portions, a central rib portion, and a peripheral rim portion thereof; the central rib portion being coupled to and disposed between at least a portion of the first and second depressed plate portions; the peripheral rim portion extending around at least a portion of the first and second depressed plate portions; the central rib portion and the peripheral rim portion being substantially co-planar with one another;

the first corrugated support member being disposed in a first internal region defined by the first depressed plate portion of the pan member and the cover plate, the first corrugated support member being further disposed between and directly contacting both the first depressed plate portion and the cover plate; the first corrugated support member having a first plurality of flow channels extending therethrough;

the second corrugated support member being disposed in a second internal region defined by the second depressed plate portion of the pan member and the cover plate, the second corrugated support member being further disposed a predetermined distance away from the first corrugated support member, the second corrugated support member being further disposed between and directly contacting both the second depressed plate portion and the cover plate; the second corrugated support member having a second plurality of flow channels extending therethrough;

the cover plate being disposed on and coupled to the pan member, the cover plate having first and second surfaces, the first surface directly contacting the first and second corrugated support members and the peripheral rim portion of the pan member, the second surface being disposed on and directly contacting the thermally conductive layer, the first and second corrugated support members being held between the cover plate and the pan member in the first and second internal regions, respectively;

a battery module being disposed on and contacting the thermally conductive layer;

a first tubular port being coupled to the cover plate, the first tubular port extending at least partially through a first aperture in the cover plate into the first internal region and further outwardly from the second surface of the cover plate; and a second tubular port being coupled to the cover plate, the second tubular port extending at least partially through a second aperture in the cover plate into the second internal region and further outwardly from the second surface of the cover plate; such that a coolant flows through the first tubular port into the first internal region and through the first plurality of flow channels of the first corrugated support member, the coolant further flows into the second internal region and through the second plurality of flow channels of the second corrugated support member and exits the second tubular port.

16. The battery pack of claim 15, wherein the pan member is integrally formed with the first and second depressed plate portions, the central rib portion, and the peripheral rim portion therein.

17. The battery pack of claim 15, wherein the first corrugated support member has at least first, second, and third wall top wall portions disposed apart from one another and first, second, and third bottom wall portions disposed apart from one another, the first, second, and third wall top wall portions directly contacting the cover plate, the first, second, and third wall bottom wall portions directly contacting the first depressed plate portion of the pan member.

* * * * *